May 5, 1964

E. E. BAUMAN 3,132,209

SUBSTATION FILTER HAVING SATURABLE REACTOR FOR SELECTIVELY FURNISHING FREQUENCY DEPENDENT COUPLING UNDER HOOK SWITCH CONTROL

Filed Sept. 9, 1957

INVENTOR.
EDWARD E. BAUMAN

BY Brown, Jackson, Boettcher & Dienner

United States Patent Office 3,132,209

Patented May 5, 1964

3,132,209

SUBSTATION FILTER HAVING SATURABLE REACTOR FOR SELECTIVELY FURNISHING FREQUENCY DEPENDENT COUPLING UNDER HOOK SWITCH CONTROL

Edward E. Bauman, Galion, Ohio, assignor to North Electric Company, Galion, Ohio, a corporation of Ohio Filed Sept. 9, 1957, Ser. No. 682,893
1 Claim. (Cl. 179—15)

This invention is directed to filter switches, and more particularly to filter switches which include variable impedance means for selectively coupling telephone substations to two-wire transmission lines carrying carrier frequencies.

In the communications field, it is frequently more economical to transmit simultaneously a plurality of separate signals at different frequencies comprising channels over a single pair of conductors, than to provide a separate pair of conductors for each signal or channel. For example, in many rural areas it is more advantageous from a cost standpoint to create additional signalling channels by transmitting different preselected carrier frequencies over existing physical transmission paths than to add additional physical paths. In such type arrangements, each of the different frequencies (*f*1, *f*2, *f*3, etc.) establishes a separate path or channel, and signal intelligence is transmitted over these carrier channels by modulating such frequencies with the audio frequency intelligence to be transmitted. The regular audio frequency signals are transmitted for physical substations along the existing physical transmission path.

In addition to the regular substations connected to physical line, carrier substations may be coupled to the physical line through appropriate termination arrangements for the purpose of passing only carrier demodulated audio frequency to the carrier substations. The assigned carrier frequency signal is demodulated by the termination equipment associated with the substations and the audio frequency component conveyed by such signal is passed to the substation set.

Additionally, the first section of the physical line may end in a carrier termination which serves a group of carrier subscribers, and a high pass filter connected at such carrier termination permits certain other carrier frequencies to pass to an extended section of the two-wire physical line (which is not metallically connected to the first section), for the purpose of serving more distant carrier subscribers.

These and other installations of this type are more fully shown and described in U.S. Patent 2,875,366 which issued February 24, 1959, on a copending application to Bauman et al., and was assigned to the assignee of this invention.

It is apparent that no such terminating arrangement is required for the physical substations which are connected to the transmission line for the reception of audio frequency signals appearing thereon. However, these physical substations, as well as carrier substations which are connected to lines having carrier frequencies thereon, do require expensive and extended filter systems between the transmission line and the substation to block the modulated carrier frequency energy from the substation, and to simultaneously permit the passage of audio frequency (A.-F.) signals. Moreover, in addition to the expense because of their complexity, such filters offer only a partial solution to the problem, since the known types of filters provide a substantial bridging loss, reduce the frequency response of the audio frequency circuit, and when the substation handset is in the "on-hook" condition (in which condition the filter is not terminated), the filter itself exhibits characteristics that result in selective frequency short circuits. That is, at a certain frequency or frequencies the filter presents an effective short circuit impedance, thus resulting in the delection of any signal transmitted at such frequency on the line. It is therefore clear that such filters are inadequate to effectively accomplish the desired purposes.

The problems set forth hereinbefore would be greatly simplified if a filter switch could be designed to exhibit a high impedance to both carrier and A.-F. signals when the substation is not conditioned for use ("on-hook" condition) and to exhibit high impedance to the carrier signals and only negligible attenuation to such A.-F. signals when the substation is conditioned for use ("off-hook" condition), and it is a specific object of this invention to provide switching means operable in this manner.

It is another object of this invention to provide switching means, including variable impedance means and filter means, for exhibiting a high impedance to carrier frequency and audio frequency signals when a substation is not in use (see FIG. 5), and for exhibiting high impedance to the carrier frequency signals and low attenuation to audio frequency signals when the substation is conditioned for use.

The features of the present invention which are believed to be novel are set forth with particularity in the appended claim. The invention itself, together with further objects and advantages thereof, may best be understood by reference to the following description taken in connection with the accompanying drawings, in the several figures of which like reference numerals identify like elements, and in which:

Figures 1, 2, 3, 4, 5, 6:
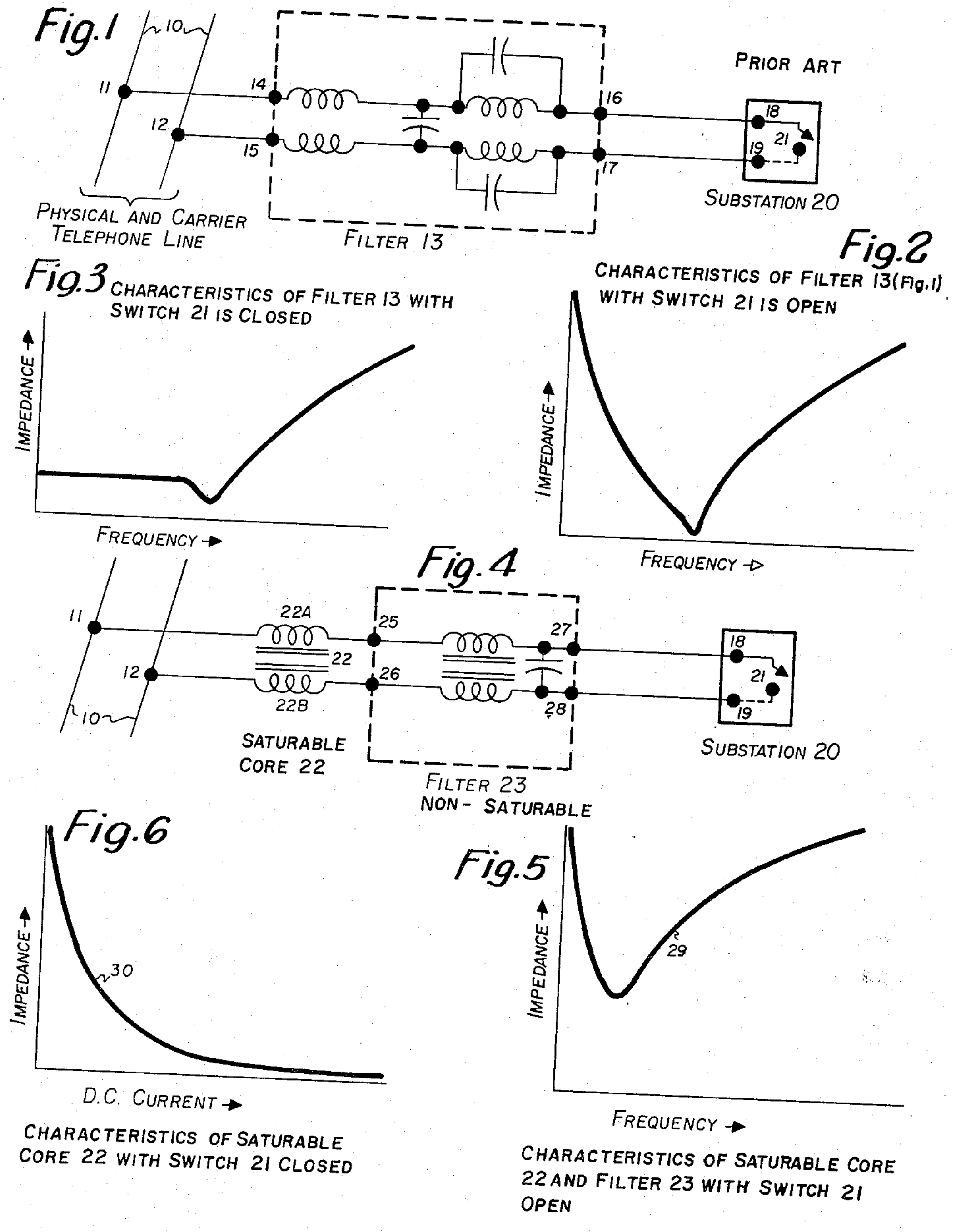
FIGURE 1 is a schematic diagram, partially in block form, of a prior art device.
FIGURE 2 is a graphical illustration useful in understanding the operation of the device shown in FIGURE 1 in which a frequency "short" within the audio range is indicated.
FIGURE 3 is a graphical illustration useful in understanding the operation of the devices of both FIGURES 1 and 4.
FIGURE 4 is a schematic diagram of an embodiment of the invention.
FIGURES 5 and 6 are graphical illustrations useful in understanding the operation of the embodiment of the invention shown in FIGURE 4.

In FIGURE 1 the illustrated prior art device comprises transmission line 10 including a pair of physical line conductors having connecting terminals 11 and 12, respectively, for coupling the input terminals of subscriber drop thereto. The subscriber equipment may basically comprise a low pass filter 13 having input terminals 14 and 15 connected to line terminals 11 and 12, and its output terminals 16 and 17 coupled to the input terminals 18 and 19 of a conventional substation 20 including a normally open hook switch means 21. Switch 21 is in the position shown in FIGURE 1 when the handset (not shown) of substation 20 is in the on-hook position, and is closed responsive to removal of the handset when a subscriber wishes to initiate a call, or to receive a call as signaled by the actuation of the ringing circuit (not shown) in substation 20.

When switch 21 is open, filter 13 is not terminated and so exhibits the undesirable selective frequency short circuit characteristics described hereinbefore and illustrated in FIGURE 2. As shown thereat, the impedance of the filter 13 approaches zero at a particular frequency as the frequency of the signal applied to the input side of filter 13 increases. It is apparent, therefore, that signals coupled along transmission line 10 will have this frequency appreciably attenuated by the effective short-circuit impedance of filter 13, thus appreciably reducing whatever intelligence was transmitted at such frequency. The impedance-frequency characteristic exhibited by filter 13 when switch 21 is closed (filter 13 is then terminated) is shown in FIGURE 3 in which only a slight drop in impedance occurs above the audio band.

In accordance with the invention, switching means including variable impedance means 22 and a simplex filter 23 (FIG. 4) is coupled between the transmission channel 10 and the substation. The variable impedance means may include saturable reactors 22A and 22B, coupled between line terminals 11 and 12 and the input terminals 25 and 26 of filter 23. The output terminals 27 and 28 of filter 23 are coupled to terminals 18 and 19 of the telephone substation.

When saturable reactors 22A and 22B are utilized as shown in FIGURE 4 and the cores of these reactors have a low value of flux density, reactors 22A and 22B present a very high impedance to carrier and A.-F. signals. As the frequency of such signals increases, the saturable reactors present an even higher impedance, as illustrated by curve 29 in FIGURE 5 of the drawing. It is noted that this desirable effect of the variable impedance is achieved even though the output side of filter 23 is not terminated by the closure of switch 21. Thus, even in the on-hook condition of substation 20, a desirable impedance characteristic is obtained as shown in FIGURE 5, in contradistinction to the selective frequency short circuiting shown in FIGURE 2, which is obtained with prior art filter arrangements.

The cores of the saturable reactors may be constructed of suitable magnetizable material, and a D.-C. or very low frequency A.-C. control current may be coupled around the core to vary the degree of its magnetization. Such control current may be provided, for example, by the D.-C. supervisory current which flows between the transmission channel and a substation when the substation is conditioned for operation. As the magnetization of the core is increased, the value of the impedance to carrier and A.-F. signals presented by such saturable reactors is sharply decreased. This relationship is illustrated in FIGURE 6, where the curve 30 is indicative of the impedance to A.-C. signals presented by saturable reactors responsive to an increase in the D.-C. magnetizing current, which produces a field in the core of such a reactor.

The saturable reactors 22A and 22B offer negligible impedance to both carrier and A.-F. signals after the D.-C. supervisory current has reduced the impedance of the reactors. However, filter 23 is effective to block any carrier frequency signals and to pass audio frequency signals to the associated substation 20. Filter 23 may be a simple low-pass arrangement consisting of only a few elements as shown in FIG. 4, because the output side of filter 23 is terminated by the closure of switch 21 and the connection of the telephone substation components (not shown) across the output terminals of the filter whenever the saturable reactors pass alternating current signals. Thus the utilization of the novel switching arrangement comprising variable impedance means and a simplex filter effects a substantial economy in the construction of filters for such applications.

The variable impedance means of the inventive structure does not exhibit a short circuit impedance to certain frequencies as do prior art arrangements, and thus does not diminish the frequency response of the telephone substation circuit in the manner of the prior art devices. The novel structure of the invention acts substantially as a mechanical switch, there is no bridging loss to shunt the transmission line, such as is experienced in most known types of filter devices.

While simultaneously providing the foregoing advantages, the inventive structure is also effective to permit the use of simple and inexpensive filter structures, which require only a few elements.

While a particular embodiment of the invention has been shown and described, it is apparent that modifications and alterations may be made therein, and it is intended in the appended claim to cover all such modifications and alterations as may fall within the true spirit and scope of the invention.

What is claimed is:

In a telephone system, a transmission line over which signals at various frequencies, including carrier frequency and audio frequency signals and a D.C. component are transmitted, substation means including a switch, coupling means including D.C. responsive variable impedance means and low pass filter means coupled between said transmission line and said substation means, said coupling means having a high impedance to both said carrier and said audio signals when said switch at the substation is open and no D.C. flows in said coupling means, and said coupling means having a high impedance to said carrier signals and only a negligible impedance to said audio signals when said switch at the substation is closed and a D.C. flows in said coupling means.

References Cited in the file of this patent

UNITED STATES PATENTS

| | | |
|---|---|---|
| 2,151,173 | Whittle | Mar. 21, 1939 |
| 2,315,784 | Goodale | Apr. 6, 1943 |
| 2,413,263 | Suter | Dec. 24, 1946 |
| 2,650,350 | Heath | Aug. 25, 1953 |
| 2,694,954 | Kock | Nov. 23, 1954 |
| 2,708,219 | Carver | May 10, 1955 |
| 2,777,994 | Hurault | Jan. 15, 1957 |
| 2,924,667 | Hochgraf | Feb. 9, 1960 |